United States Patent [19]

Ukai et al.

[11] 4,396,200
[45] Aug. 2, 1983

[54] PACKING ASSEMBLY FOR SEALING BETWEEN CYLINDER HEAD AND CYLINDER HEAD COVER GASKET

[75] Inventors: Mikio Ukai, Nagoya; Tohru Kuniyoshi, Ichinomiya; Tomoyoshi Yamada, Inazawa, all of Japan

[73] Assignee: Toyoda Gosei Co. Ltd., Aichi, Japan

[21] Appl. No.: 372,705

[22] Filed: Apr. 28, 1982

[51] Int. Cl.³ .............................................. F16J 15/12
[52] U.S. Cl. ...................................... 277/169; 277/12; 277/189; 123/90.37; 123/90.38; 123/195 C; 123/198 E
[58] Field of Search ................... 277/12, 32, 169, 180, 277/189; 123/90.37, 90.38, 198 R, 198 E, 195 C

[56] References Cited
U.S. PATENT DOCUMENTS
4,227,705 10/1980 Kuramoto ................... 123/90.37 X FOREIGN PATENT DOCUMENTS
51-31975 10/1976 Japan ................................... 277/12
964684 7/1964 United Kingdom ............... 277/169

Primary Examiner—Robert S. Ward, Jr.
Attorney, Agent, or Firm—Cushman, Darby & Cushman

[57] ABSTRACT

A semicircular packing comprising a metallic portion and an elastic portion sealing the pierced hole of the cylinder head when setting, having thick portions at both ends of auricules and a thin portion between thick portions at both ends, at least on the metallic portion partly contacting with the outer surface of the pierced hole. This semicircular packing is easily conformed to the curved peripheral surface of the pierced hole and makes it unnecessary to coat it with sealing liquid as well as able to permit the clamping torque of the cylinder head to be small and yet maintain its sealing state over a long term of years without being subjected to excessive or premature aging.

4 Claims, 9 Drawing Figures

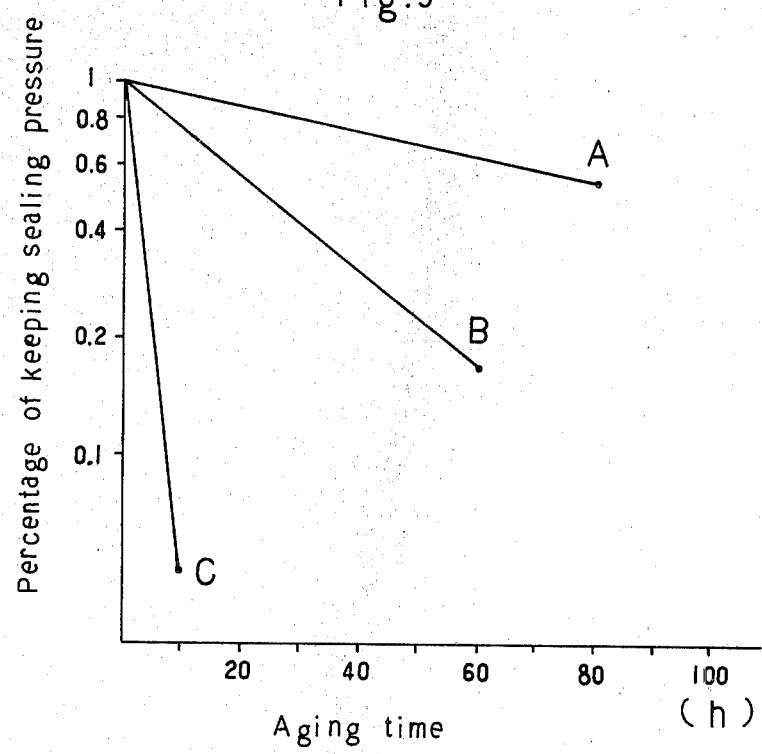

4,396,200

PACKING ASSEMBLY FOR SEALING BETWEEN CYLINDER HEAD AND CYLINDER HEAD COVER GASKET

BACKGROUND OF THE INVENTION (1) Field of the Invention

This invention relates to a semicircular packing sealing the semicircular hole pierced in a cam fitting portion when setting the cylinder head of an overhead cam-type automobile internal combustion engine.

(2) Description of the Prior Art

The existent semicircular packing is semidiscoidal and made of an elastic member such as rubber and plastic or of a metallic member. However, there have been disadvantages in those respective members as follows: the semicircular packing made of the elastic member has been formed larger than the pierced hole from the requirement of interference, so that there has been a likelihood that a gap will be between the cylinder head and the cylinder head cover gasket at the outward extend of the auricular, i.e. ear-like portion of the semicircular packing (at both ends of edge portion of the semicircular packing). And, to get rid of this gap, it has been necessary to apply sealing material or increase load to the cylinder head cover gasket, which has been troublesome, taking much time.

And, in the case of forming the semicircular packing to be approximately equal to the pierced hole or forming with material softer than the semicircular packing, there has been a likelihood that a gap will be caused by the semicircular packing being sunken below the sealed surface of the cylinder head because of increasing load to the cylinder head cover gasket or, even if the load is not heavy, of causing permanent deformation of the elastic member due to aging from many years of use.

And, in the method which involves increasing the load to the cylinder head cover gasket, there has been caused excessive deformation, thereby accelating aging.

On the other hand, when the semicircular packing made of a metallic member has been formed smaller than the pierced hole and coated with sealing liquid to the fill gap between the semicircular packing and the pierced hole, the sealing effect of the sealing liquid has been rapidly decreased in proportion to the increase of the gap and, in the case of a large gap due to dispersion of the size of the semicircular packing, the sealing has been liable to be imperfect. And, when setting again after removing the cylinder head cover gasket, it has been necessary to remove the sealed material thoroughly and to coat it with sealing liquid again which has been trouble, taking much time.

SUMMARY OF THE INVENTION

An object of this invention is to provide a semicircular packing comprising a metallic portion and an elastic portion and at least forming an elastic portion on the surface of the metallic portion and making auricules i.e. ear-like forms of both ends of elastic portions thick and a middle portion between both auricules thin, so that when setting, a part of the metallic portion is kept in contact with the outer surface of the pierced hole and the elastic portion on the metallic portion becomes conformed to the turning of the pierced hole, thus making the clamping torque small and preventing the cylinder head cover gasket from excessive deforming as well as maintaining the sealing state of the pierced hole of the cylinder head without being subjected to the influence of sinking even if it is used for many years.

Another object of this invention is to provide a semicircular packing without causing a gap between the cylinder head and the cylinder head cover gasket at the outward extent of the auricule of the semicircular packing when in use and without requiring application of sealing liquid on the surface of the semicircular packing.

A further object of this invention is to provide a semicircular packing forming an elastic portion on the surface of the metallic portion formed to be thick at both ends of auricules and the middle portion between both thick portions formed to be thin and forming the elastic portion to be circular, thus windingly covering the outer circumference of the metallic portion and further forming a contacting portion shaping corresponding to the pierced hole on both sides of the thickness direction of the metallic portion, the packing thereby being capable of maintaining a complete sealing state when setting the cylinder head and requiring no application of sealing liquid.

Yet another object of this invention is to provide a semicircular packing forming a flange portion on both sides of the thickness direction of the metallic portion and when setting the cylinder head, the flange portion being able to hold the cylinder head and make locating easy as well as make setting stability good.

BRIEF DESCRIPTION OF THE DRAWINGS

FIG. 9 is a graphic chart showing respective testing results of aging acceleration of semicircular packing of the first and second embodiments and the existent semicircular packing.

DESCRIPTION OF THE PREFERRED EMBODIMENTS

Figure 1:
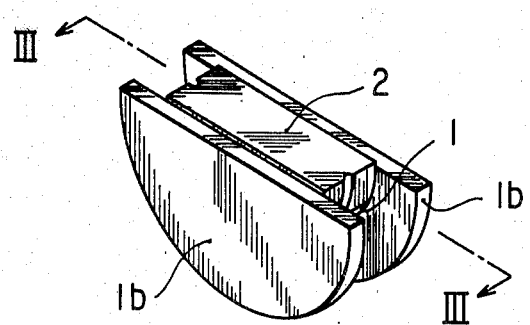
FIG. 1 is a perspective view showing the first embodiment of this invention.
Figure 2:
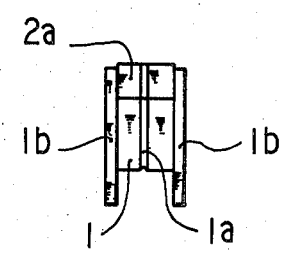
FIG. 2 is a side view showing the first embodiment of this invention.
Figure 3:
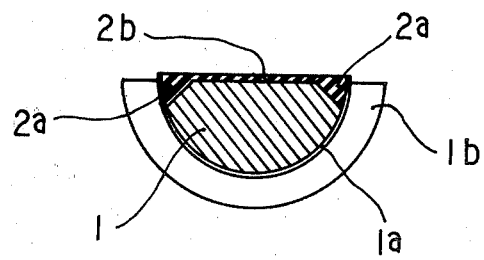
FIG. 3 is a sectional view on line III—III of FIG. 1.

Preferred embodiments of this invention will be described in the following.

FIGS. 1 to 4 show the first embodiment, in which a metallic portion is formed to be rather smaller than a pierced hole 3a (FIG. 4) and formed as a sectional semicircular member notched at both ends of its auricules. On the surface of the metallic portion 1, an elastic portion 2 made of gummous elastic is sulfurizingly bonded i.e. vulcanized and, on the auricules of both ends of the elastic portion 2, a thick portion 2a is formed and between both ends of the thick portions 2a, a thin portion 2b is formed. The surface of the elastic portion 2 is formed so as to project upward towards a sealing face 4 between a cylinder head 3 and a cylinder head cover gasket 5 and the surface of the elastic portion 2 is formed to be smooth and parallel with the sealing face 4 and on the semicylindrical surface of the metallic portion 1 and the elastic portion 2, a groove 1a is formed. In the first embodiment of this invention, a flange portion 1b is projectingly formed from the elastic portion 2 on both sides of the axial thickness direction of the metallic portion 1 so as to grip the cylinder head 3. Of course, the flange portion 1b is formed so as to make locating easy as well as make stability good when setting the semicircular packing of the first embodiment to the cylinder 3, so that even if the flange portions 1b are not formed, the sealing effect can be maintained.

Figure 4:
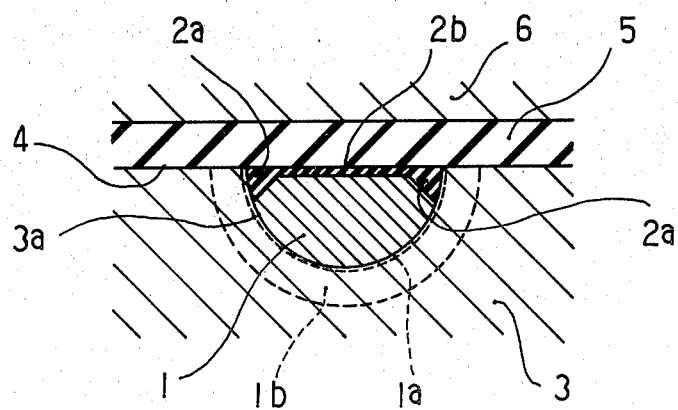
FIG. 4 is a sectional view showing the first embodiment in use.
Figure 5:
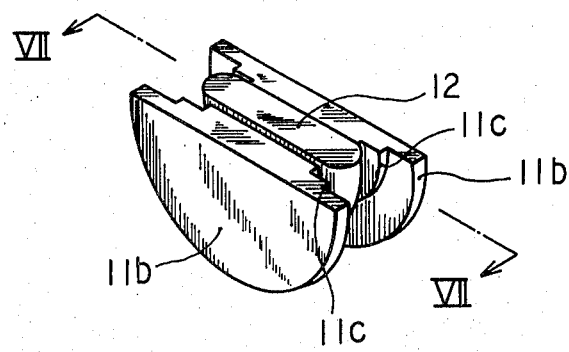
FIG. 5 is a perspective view showing second embodiment of this invention.
Figure 6:
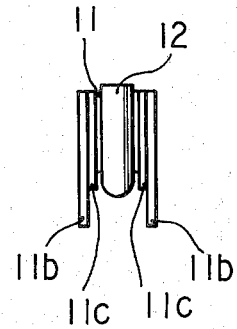
FIG. 6 is a side view showing the second embodiment of this invention.
Figure 7:
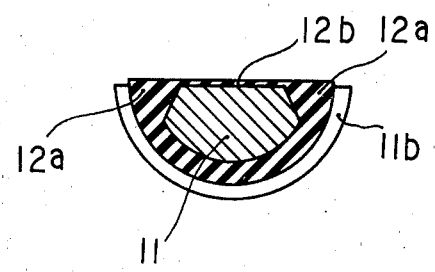
FIG. 7 is a sectional view on line VII—VII of FIG. 5.

Now, the use of the first embodiment will be described, As shown in FIG. 4, on the semicylindrical surface and groove 1a of the metallic portion 1 on the elastic portion 2, sealing material is coated, and the semicircular packing of the first embodiment is fitted to the semicylindrical form of the pierced hole or notch 3a of the cylinder head 3. The metallic portion 1 comes in contact with the surface of the pierced hole 3a and the elastic portion 2 on the metallic portion 1 is pressed to the cylinder head cover gasket 5. Since the elastic portion 2 is formed on the metallic portion 1, even if clamping force between the cylinder head 3 and the cylinder head cover gasket is small, the elastic portion is easily deformed. Especially, because the thick portion 2a is formed on the auricules of the elastic portion 2, it increases deformability and becomes conformed to the turning of the pierced hole 3a, so that even if the clamping torque is small when setting the cylinder head 3, a complete sealing state can be maintained. Since the thin portion 2b is formed on the metallic portion 1, it does not sink below the sealing face even if the elastic portion 2 is subjected to aging or put under strong pressure. Moreover, it is unnecessary to coat sealing liquid on the surface that is arranged for with the cylinder head cover gasket, so that there is no such a trouble as would come from needing to repeatedly coat sealing liquid onto the surface when setting the cylinder head cover gasket. Since this semicylindrical packing has flange portions 1b which hold both end perimetrical margins of the pierced hole 3a when setting, the stability of the semicylindrical packing is good and locating is facilitated.

FIGS. 5 to 8 show a second embodiment of this invention. An elastic portion 12 made of gummous elastic is formed as a semicircular ring is windingly covered on the outer circumference of the metallic portion 11. A thick portion 12a is formed at both ends of auricules of the elastic portion 12 and between both ends of the thick portion 12a, a thin portion 12b is formed. When the elastic portion 12 is windingly covered on the metallic portion 11, the semicircular portion is rather larger than the pierced hole 13a of the cylinder head. The elastic portion 12 projects upward from the sealing face between the cylinder head 13 and the cylinder head cover gasket when the contacting portion 11a comes in contact with the surface of the pierced hole 13a. The upper surface of the elastic portion 12 is smooth and parallel with the sealing face. In the same sense as the first embodiment, a flange portion 11b is formed on the outside of a contacting portion 11c at both axially opposite ends of the metallic portion. However, even if these flange portions not formed, the sealing effect can of course be maintained.

Figure 8:
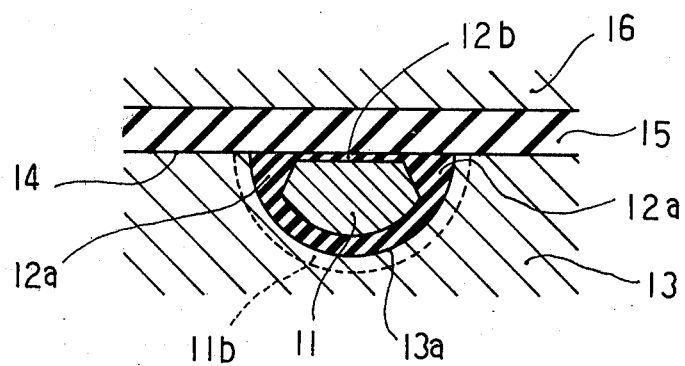
FIG. 8 is a sectional view showing the second embodiment of this invention in use.

Next, the use of second embodiment will be described. As shown in FIG. 8, the elastic portion 12 wrapped about the metallic portion 11 is fitted to the semicircular pierced hole 13a and the contacting portion 11c comes in contact with the end perimetrical margins of the pierced hole 13a. The upper part of the elastic portion 12 is pressed against the cylinder head cover gasket 15 and the semicircular part of the elastic portion is pressed against the surface of the pierced hole 13a. The upper surface of the elastic portion 12 is easily deformed against the metallic portion 11, even if the clamping force between the cylinder head 13 and the cylinder head cover gasket is small. Especially, since the thick portion 12a is formed at auricules of the elastic portion 12, with increasing of deformability and becoming easily conformed to the turning of the pierced hole 13a, a complete sealing state can be attained. Since the thin portion 12b is formed at the upper part of the elastic portion 12 on the metallic portion 11, even if the elastic portion is subjected to aging or put under strong pressure, the portion will not sink beneath the sealing face 14. Moreover, in the elastic portion 12, the semicircular part is pressed in constant displacement, so that a form and a material suitable to provide heat-resistant and oil-resistant conditions can easily be selected by considering the compression rate. It is unnecessary to coat sealing liquid on the elastic portion 12, thus requiring no such a trouble as would result from needing to repeatedly coat sealing liquid on the portion after removing sealed material when setting the cylinder head gasket. Since the elastic portion 12 encircles the metallic portion 11, exchanging the elastic portion 12 becomes easy.

Next, testing results of accelerated aging using respective semicircular packings of the first and second embodiments and existence will be described.

Testing method:
(1) Set the semicircular packing to the cylinder head.
(2) Clamp the semicircular packing with the torque of 50 kgcm, charge engine oil into the cylinder head and expose to the atmosphere at 140° C.
(3) After a given time, remove the engine oil and cool to the room temperature (15° C.).
(4) After cooling, measure leakage pressure in water by using compressed air.
(5) Measure leakage pressure before aging, compare it with leakage pressure after aging and attain a percentage of keeping sealing pressure.

Percentage of keeping sealing pressure =

$$\frac{\text{leakage pressure after aging}}{\text{leakage pressure before aging}}$$

Testing objects:
A . . . The semicircular packing of the first embodiment of this invention.
B . . . The semicircular packing of second embodiment of this invention.
C . . . The semicircular packing comprising the existent elastic body.

Testing results:
As shown in FIG. 9, the semicircular packing of this invention improves the percentage of keeping sealing pressure compared with that of the existing packing and maintains sealing effect, being rarely subjected to the influence of aging of the elastic body.

What is claimed is:
1. A packing assembly for sealing between an edge surface of a cylinder head and a surface of cylinder head cover gasket at a site where the edge of the cylinder head which is to be confronted by the cylinder head cover gasket is provided with a notch having a wall surface providing a profile of a predetermined shape, this surface having two perimetrically opposite ends and opening towards the cylinder head cover gasket, said packing assembly comprising:
- (a) a relatively rigid member including a body having a perimeter with two main portions, including a first portion which is shaped generally complementarily to said wall surface of said notch, and a second portion which is shaped generally complementarily to said cylinder head cover gasket surface, each of these main portions having two respectively perimetrically opposite ends, said body perimeter further including two relieved corner surface portions, each joining a respective first and second main portion of said perimeter and thus providing two respective recesses; and
- (b) an elastic member having a thin portion with a respective thick portion disposed at two respectively opposite ends of said thin portion, said elastic member being perimetrically disposed upon said relatively rigid member with said thin portion overlying said second portion of said perimeter of said body and said thick portions respectively overlying said corner surface portions in said recesses, so that when said body is received in said notch, said elastic member, as to both the thin and thick portions thereof, is positioned to be elastically deformed by confrontation with said cylinder head cover gasket surface as said cylinder head cover gasket surface is urged against said edge of said cylinder head.

2. A packing assembly for sealing between a cylinder head and a cylinder head cover gasket at a site where the edge of the cylinder head which is to be confronted by the cylinder head cover gasket is provided with a notch of at least generally semi-circular figure, having two perimetrically opposite ends and a defining surface which is concavely curved towards the cylinder head cover gasket, said packing assembly comprising:

- (a) a metallic member including a body of at least generally semi-cylindrical form so as to have a convex perimetrical surface portion having perimetrically opposite ends, an at least generally flat surface portion having perimetrically opposite ends, and two respectively angularly oppositely relieved corner surface portions joining respective ends of said convex and flat surface portions and thus providing recesses at perimetrically opposite ends of said metallic member body; and
- (b) an elastic member having a thin portion with a respective thick portion disposed at two respectively opposite ends of said thin portion, said elastic member being perimetrically disposed upon said metallic member with said thin portion overlying said at least generally flat surface portion and said thick portions respectively overlying said corner surface portions in said recesses, so that when said body is received in said notch, said elastic member, as to both the thin and thick portions thereof, is positioned to be elastically deformed by confrontation with said cylinder head cover gasket as said cylinder head cover gasket is urged against said edge of said cylinder head.

3. The packing assembly of claim 1, wherein:
the elastic member further includes a band looping from one said thick portion to the other, so that the elastic member has the form of a ring, this ring-form elastic member perimetrically encircling said body for mounting the elastic member to the metallic member.

4. The packing assembly of claim 2 or claim 3, wherein:
said metallic member further including respective axially opposite end flanges provided on said body, said end flanges projecting radially beyond said convex perimetrical surface portion, and being thereby arranged to grip the cylinder head between them marginally of said notch.

* * * * *